(12) United States Patent
Wang et al.

(10) Patent No.: US 8,040,961 B2
(45) Date of Patent: Oct. 18, 2011

(54) SAMPLE REARRANGEMENT FOR A COMMUNICATION SYSTEM WITH CYCLIC EXTENSION

(75) Inventors: Jinder Wang, San Jose, CA (US);
Frank Lane, Asbury, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 654 days.

(21) Appl. No.: 12/142,772

(22) Filed: Jun. 19, 2008

(65) Prior Publication Data

US 2009/0316837 A1 Dec. 24, 2009

(51) Int. Cl.
*H04L 27/28* (2006.01)
*H04K 1/10* (2006.01)
*H04L 27/00* (2006.01)

(52) U.S. Cl. ........................................ 375/260; 375/259

(58) Field of Classification Search .................... 375/260
See application file for complete search history.

(56) References Cited

U.S. PATENT DOCUMENTS 7,577,085 B1 * 8/2009 Narasimhan .................. 370/206
7,586,992 B2 9/2009 Kwun et al.
2008/0112359 A1 * 5/2008 Cleveland et al. ............ 370/329

FOREIGN PATENT DOCUMENTS

WO WO2009143060 11/2009

OTHER PUBLICATIONS

Hwang, T. et al.: "Iterative cyclic prefix reconstruction for coded single-carrier systems with frequency-domain equalization (SC-FDE)," The 57th IEEE Semiannual Vehicular Technology Conference, Proceedings, vol. 3, Apr. 22, 2003, pp. 1841-1845, ISBN: 978-0-7803-7757-8, sections 1-3.
Im, G-H. et al.: "Efficient cyclic prefix reconstruction for coded OFDM systems," IEEE Communications Letters, vol. 8, No. 5, May 1, 2004, pp. 274-276, ISSN: 1089-7798, sect 1-3, abstract, fig. 1.
International Search Report/Written Opinion—PCT/US09/047819—International Search Authority EPO—Mar. 30, 2010.
Kim, M-S. et al.: "An efficient cyclic prefix reconstructino technique for MIMO single-carrier frequency-domain equalization," IEEE Communications Letters, vol. 11, No. 4, Apr 1, 2007, pp. 316-318, ISSN: 1089-7798, sections 2-3.

* cited by examiner

*Primary Examiner* — David C. Payne
*Assistant Examiner* — Erin File
(74) *Attorney, Agent, or Firm* — Stanton Braden

(57) ABSTRACT

Signal detectivity is improved by implementation of address adjustment to reorder samples and to discard undesired samples. Such reordering is utilized when the time order of received samples are distorted and/or corrupted, which can occur in at least three situations. If the samples are distorted in time order, the samples are rearranged to allow the samples to return to proper order. The samples, if corrupted, are discarded and replaced with zero samples.

22 Claims, 12 Drawing Sheets

SAMPLE REARRANGEMENT FOR A COMMUNICATION SYSTEM WITH CYCLIC EXTENSION

BACKGROUND

I. Field

The following description relates generally to communication systems and more particularly to improving communications in a wireless communications network.

II. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, and orthogonal frequency division multiple access (OFDMA) systems.

Wireless communication systems have become a prevalent means by which majority of people worldwide have come to communicate. Wireless communication devices have become smaller and more powerful in order to meet consumer needs and to improve portability and convenience. The increase in processing power in mobile devices such as cellular telephones has lead to an increase in demands on wireless network transmission systems.

A typical wireless communication network (e.g., employing frequency, time, and code division techniques) includes one or more base stations that provide a coverage area and one or more mobile (e.g., wireless) terminals that can transmit and receive data within the coverage area. A typical base station can concurrently transmit multiple data streams for broadcast, multicast, and/or unicast services, wherein a data stream is a stream of data that can be of independent reception interest to a mobile terminal. A mobile terminal within the coverage area of that base station can be interested in receiving one, more than one, or all the data streams carried by the composite stream. Likewise, a mobile terminal can transmit data to the base station or another mobile terminal.

When a signal of a certain signal format is transmitted on top of another signal format, the time order of received samples of this signal could be distorted and/or corrupted. This can lead to delays in communication and/or communication failures.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with implementing address adjustment to reorder the samples and to discard undesired samples to improve signal detectivity.

In accordance with an aspect is a method for sample rearrangement with cyclic extension. The method can include receiving a composite signal and removing a cyclic prefix of the composite signal. Transform processing can be performed and a channel delay analyzed. The method can further include selectively utilizing data sample rearrangement based on the analysis.

Another aspect relates to a wireless communications apparatus that includes a processor and a memory. The processor can receive a composite signal and remove a cyclic prefix of the composite signal. The processor can further perform transform processing, evaluate a channel delay, and apply data sample rearrangement based on the analysis. The memory can store information related to the analysis made by the processor.

A further aspect relates to a wireless communications apparatus that implements address adjustment to improve signal detectivity. The apparatus includes a means for receiving a composite signal and a means for removing a cyclic prefix of the composite signal. The apparatus can also include a means for performing transform processing, a means for analyzing a channel delay, and a means for selectively utilizing data sample rearrangement based on the analysis.

Still another aspect relates to a machine-readable medium having stored thereon machine-executable instructions for sample rearrangement with cyclic extension. The instructions can include receiving a composite signal that comprises a bearing signal and a carry-on signal, removing a cyclic prefix of the composite signal, performing Discrete Fourier Transform processing and an Inverse Discrete Fourier Transform processing. The instructions can also include analyzing a channel delay and selectively utilizing data sample rearrangement based on the analysis.

In a wireless communication system, another aspect relates to an apparatus that includes a processor. The processor can be configured to receive a composite signal that comprises an OFDM bearing signal and a CDMA carry-on signal. The processor can also be configured to remove a cyclic prefix of the composite signal. The processor can also be configured to perform a Fast Fourier Transform process and an Inverse Fast Fourier Transform process. Further, the processor can be configured to analyze a channel delay and selectively utilize data sample rearrangement based on the analysis.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
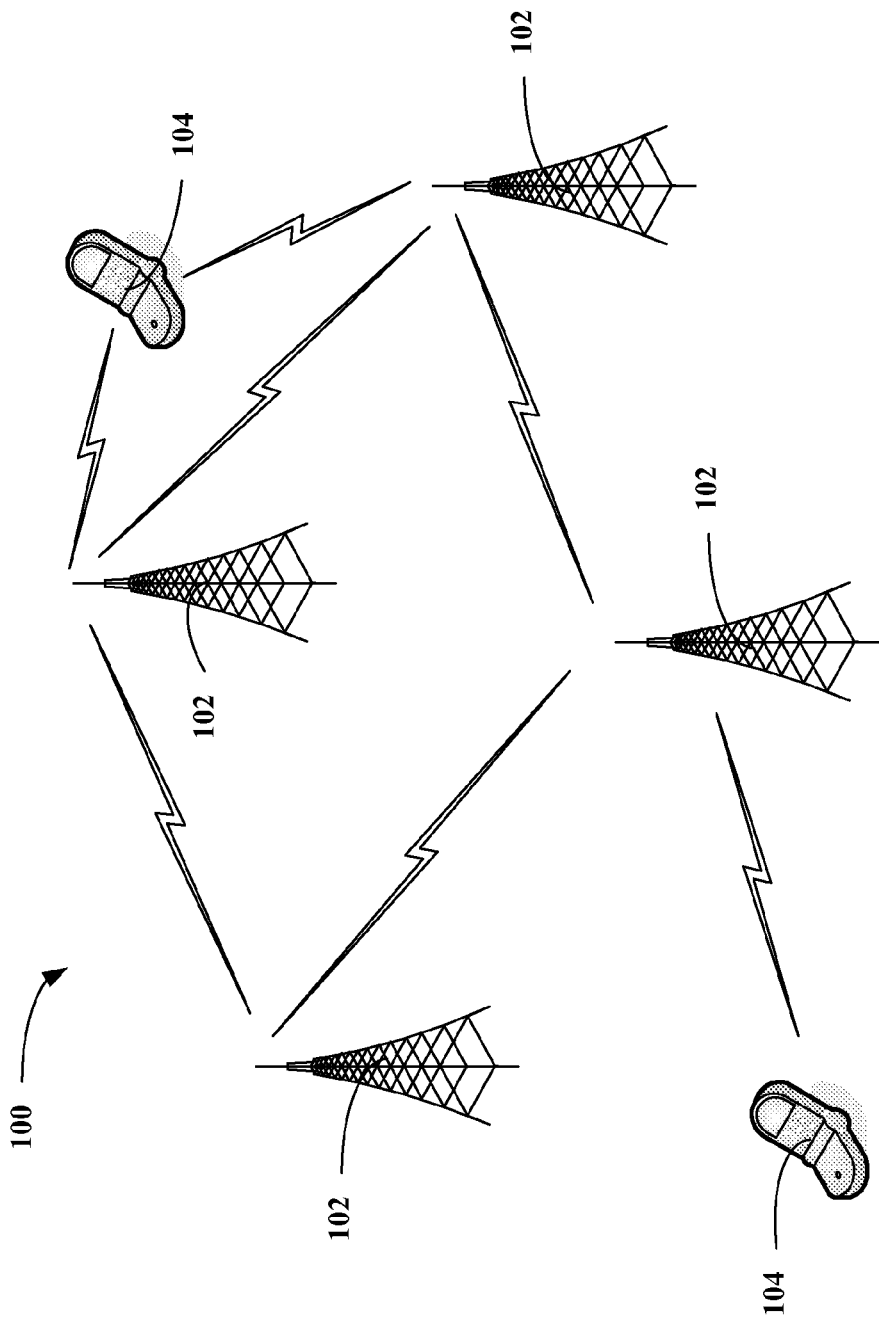
FIG. 1 illustrates a wireless communication system in accordance with various aspects presented herein.

Various aspects are now described with reference to the drawings. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing these aspects.

As used in this application, the terms "component", "module", "system", and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a wireless terminal. A wireless terminal can also be called a system, subscriber unit, subscriber station, mobile station, mobile, mobile device, device remote station, remote terminal, access terminal, user terminal, terminal, wireless communication device, user agent, user device, or user equipment (UE). A wireless terminal may be a cellular telephone, a cordless telephone, a Session Initiation Protocol (SIP) phone, a smart phone, a wireless local loop (WLL) station, a personal digital assistant (PDA), a laptop, a handheld communication device, a handheld computing device, a satellite radio, and/or another processing device for communicating over a wireless system. Moreover, various aspects are described herein in connection with a base station. A base station may be utilized for communicating with wireless terminal(s) and may also be referred to as an access point, Node B, or some other terminology.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring now to FIG. 1, a wireless communication system 100 in accordance with various aspects presented herein is illustrated. System 100 can comprise one or more base stations 102 in one or more sectors that receive, transmit, repeat, etc., wireless communication signals to each other and/or to one or more mobile devices 104. Each base station 102 can comprise multiple transmitter chains and receiver chains (e.g., one for each transmit and receive antenna), each of which can in turn comprise a plurality of components associated with signal transmission and reception (e.g., processors, modulators, multiplexers, demodulators, demultiplexers, antennas, and so forth). Each mobile device 104 can comprise one or more transmitter chains and receiver chains, such as is used for a multiple input multiple output (MIMO) system. Each transmitter and receiver chain can comprise a plurality of components associated with signal transmission and reception (e.g., processors, modulators, multiplexers, demodulators, demultiplexers, antennas, and so on), as will be appreciated by one skilled in the art.

When a mobile device(s) 104 transmits signals of a certain signal format on top of another signal format, such as OFDM, the time order of samples of this signal, as received at base station 102, could be distorted and/or corrupted. Therefore, base station 102 can be configured to rearrange the sampled data and discard the corrupted sampled data in order to improve the signal's detectivity. Since there can be different types of signal formats utilized, system 100 can provide a platform that allows for adoption of these multiple formats. Thus, system 100 does not utilize the formats independently, but selectively stacks the formats.

There are at least three cases where the sample data could be distorted in time order and/or corrupted. Depending on the case, the communication system 100 has encountered, proper actions can be taken. The samples, if distorted in time order, are rearranged to allow the samples to return to the proper order. The samples, if corrupted, can be discarded and replace with zero samples. The disclosed aspects implement address adjustment to reorder the samples and to discard undesired samples whenever the above-mentioned problem arises. The signal detectivity is thus improved.

Figure 2:
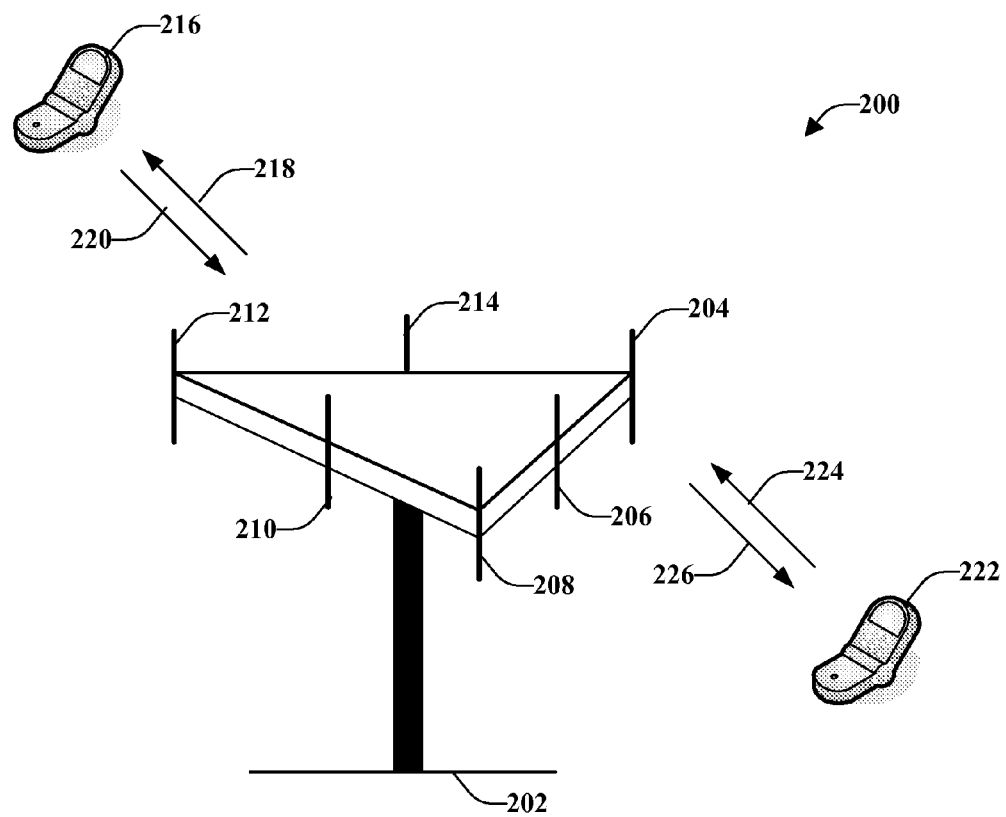
FIG. 2 illustrates a multiple access wireless communication system according to one or more aspects.

Referring now to FIG. 2, a multiple access wireless communication system 200 according to one or more aspects is illustrated. A wireless communication system 200 can include one or more base stations in contact with one or more user devices. Each base station provides coverage for a plurality of sectors. A three-sector base station 202 includes multiple antenna groups, one including antennas 204 and 206, another including antennas 208 and 210, and a third including antennas 212 and 214. According to the figure, only two antennas are shown for each antenna group, however, more or fewer antennas may be utilized for each antenna group. Mobile device 216 is in communication with antennas 212 and 214, where antennas 212 and 214 transmit information to mobile device 216 over forward link 220 and receive information from mobile device 216 over reverse link 218. Forward link (or downlink) refers to the communication link from the base stations to mobile devices, and the reverse link (or uplink) refers to the communication link from mobile devices to the base stations. Mobile device 222 is in communication with antennas 204 and 206, where antennas 204 and 206 transmit information to mobile device 222 over forward link 226 and receive information from mobile device 222 over reverse link 224.

Each group of antennas and/or the area in which they are designated to communicate may be referred to as a sector of base station 202. In one or more aspects, antenna groups each are designed to communicate to mobile devices in a sector or the areas covered by base station 202. A base station may be a fixed station used for communicating with the terminals.

Figure 3:
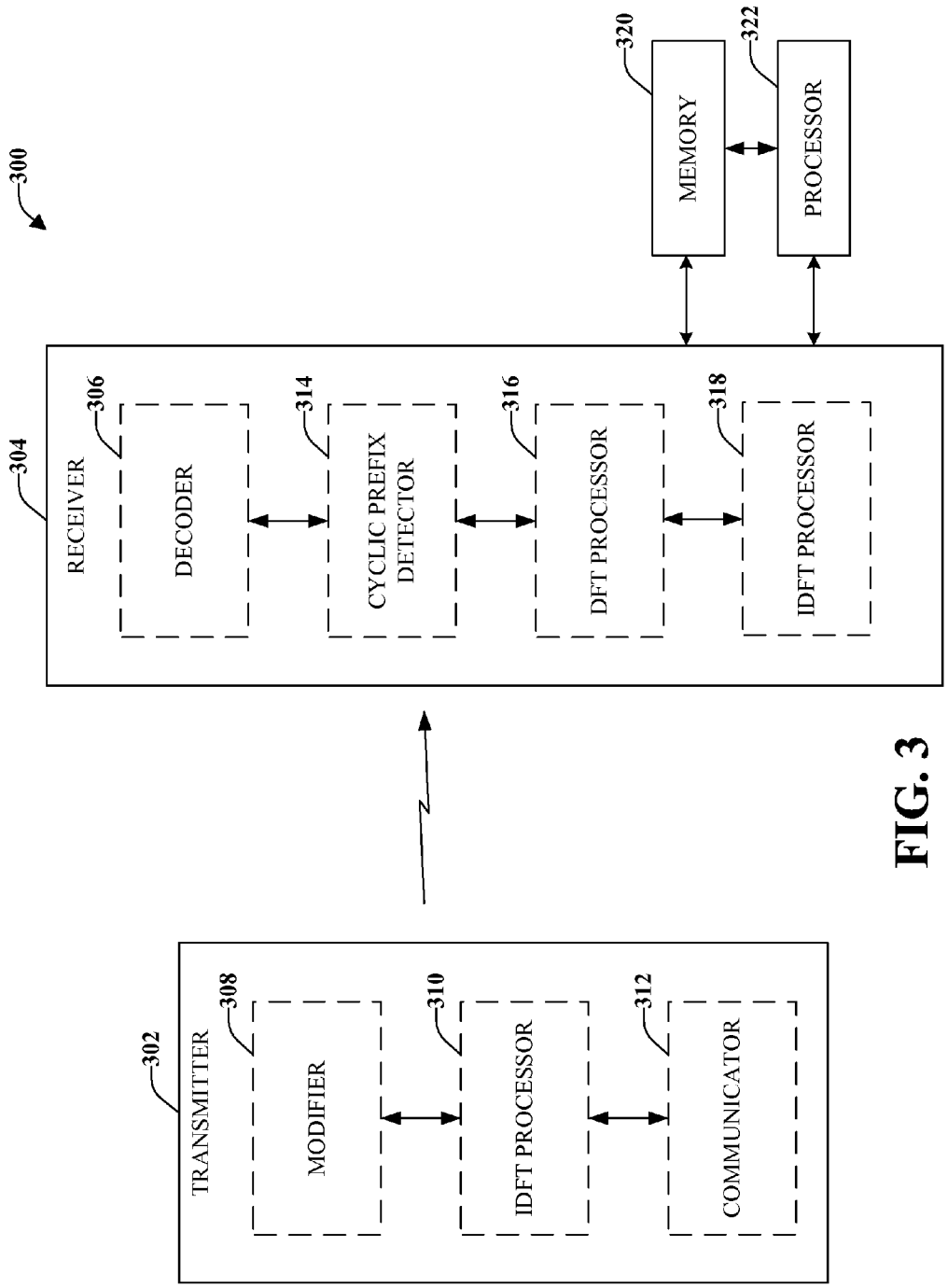
FIG. 3 illustrates a system that implements an address adjustment to reorder samples and to discard undesired samples.

FIG. 3 illustrates a system 300 that implements an address adjustment to reorder samples and to discard undesired samples. System 300 can utilize an address adjustment software/hardware/firmware device to reorder received samples and to discard undesired samples to improve signal detectivity. Although a number of transmitter(s) 302 and receiver(s) 304 can be included in a wireless network, as will be appreciated, a single transmitter 302 that transmits communication data signals to a single receiver 304 is illustrated for purposes of simplicity.

System 300 includes a transmitter 302 that is in wireless communication with a receiver 304. The communication from a base station transmitter to a mobile device receiver is referred to as the forward link and the communication from a mobile device transmitter to a base station receiver is referred to as the reverse link. The disclosed aspects can be utilized on the reverse link signals of Ultra Mobile Broadband (UMB), Long-Term Evolution (LTE), and other systems.

A signal, such as a CDMA signal, could be carried by another signal using other signal formats such as the OFDM signal. The signal, carrying another signal, is referred to as the bearing signal. Thus, in this example, the OFDM signal is a bearing signal. The signal that is carried by the bearing signal (e.g., CDMA signal in this example) is referred to as a carry-on signal. The total signal (e.g., both the bearing signal and the carry-on signal) is referred to as a composite signal.

When a composite signal is transmitted through a transmission channel with a delay, the carry-on signal could experience some unique signal changes. In order to reliably decode the carry-on signal, a receiver decoder 306 can be configured to undo this change, if it occurs.

It should be noted that although a CDMA signal is used as an example, the bearing signal could carry other signal types. Thus, the aspects disclosed herein are not limited to a CDMA signal and are applicable to other signals carried under any bearing signal format with a cyclic prefix, such as that of the OFDM signal format. It should also be noted that although the various aspects are discussed in connection with an OFDM signal format as the bearing signal, the disclosed aspects are applicable to any signal that can be used to bear another signal.

A carry-on signal is usually a single-carrier signal. In order to be carried by a bearing signal, the carry-on signal undergoes at least two transformations at the transmitter 302. These transformations can include the Discrete Fourier Transform (DFT), the Inverse Discrete Fourier Transform, the Fast Fourier Transform (FFT)), and the Inverse Fast Fourier Transform (IFFT). For a bearing signal other than the OFDM signal, a transform corresponding to the bearing signal format should be performed.

A modifier 308 can be configured to transform the carry-on signal to the DFT domain. After the DFT domain transformation, the resulting signal could be mixed with other signals at an input to an IDFT processor 310. After IDFT processing and before being further filtered and transmitted, the ending portion of the composite signal is repeated in the beginning of that composite signal. This is referred to as adding a cyclic prefix to the composite signal. The composite signal with a cyclic prefix is sent by a communicator 312 through a transmission channel that could have a delay.

At the receiver 304, the cyclic prefix of the received signal can be removed by a cyclic prefix detector 314, for example. The removal of the cyclic prefix can be exact if there is no delay in the channel, or if the delay is known and if synchronization between the transmitter 302 and the receiver 304 is perfect (referred to as Access Point (AP) Timing).

After removal of the cyclic prefix, the resulting signal is processed by a DFT processor 316. The portion of the DFT output associated with the carry-on signal is de-multiplexed. The resulting signal after de-multiplexing is processed by an IDFT processor 318. The carry-on signal is recovered at the IDFT output. If the carry-on signal is a CDMA signal, a Hadamard transform can be utilized to perform correlation to the carry-on signal and the correlated output can be decoded to yield the final information.

If the channel delay is unknown, the knowledge is imperfect and/or the synchronization is inaccurate, the time sequence of the carry-on signal after the IDFT processing could be different from the originally transmitted signal. Thus, there are actions that should be made at the receiver 304 to undo this change in order to more reliably decode the signal. For example, when the CDMA signal experiences an unknown delay smaller than the length of an OFDM cyclic prefix (CP), the carry-on signal at the IDFT output appears circularly shifted by an amount equal to that delay. In other words, the ending section of the original data appears to wrap around and come first.

For a signal having a delay larger than the cyclic prefix, a portion of data is lost and its fidelity cannot be completely preserved. When the delay is larger than twice the cyclic prefix (2*CP), decoding a signal by assuming a circular wrap-around could actually do more harm than good. It is important that the data be read-out in a manner that minimizes the loss of data fidelity. Further information relating to actions that should be performed by the receiver 304 to more reliably decode the signal will be provided below.

System 300 can include memory 320 operatively coupled to receiver 304. Memory 320 can store information related to receiving a composite signal that includes a bearing signal and a carry-on signal, performing DFT and/or IDFT processing. In accordance with some aspects, FFT and IFFT processing is performed. Memory can further store information relating to analyzing a channel delay, selectively utilizing data sample rearrangement based on analysis of the channel delay. Further, memory can store other suitable information related to signals transmitted and received in a communication network. A processor 322 can be operatively connected to receiver 304 (and/or memory 320) to facilitate analysis of information related to data sample rearrangement in a communication network. Processor 322 can be a processor dedicated to analyzing and/or generating information received by receiver 304, a processor that controls one or more components of system 300, and/or a processor that both analyzes and generates information received by receiver 304 and controls one or more components of system 300.

Memory 320 can store protocols associated with data sample rearrangement, taking action to control communication between receiver 304 and transmitter 302, and so forth, such that system 300 can employ stored protocols and/or algorithms to achieve improved communications in a wireless network as described herein. It should be appreciated that the data store (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (DRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 320 of the disclosed aspects are intended to comprise, without being limited to, these and other suitable types of memory.

In accordance with some aspects, a transceiver function that provides data permutation over a transmission channel through interleaving (permutation) at the transmitter 302 and deinterleaving (de-permutation) data at the receiver 304 can be utilized. It should be noted that the disclosed aspects are applicable to a transceiver with or without interleaving and deinterleaving, however, interleaving and deinterleaving is included in this detailed description for purposes of understanding. If interleaving and deinterleaving are not used, that function can be eliminated from the detailed description, however the principle of rearranging the received samples remains similar to that disclosed herein.

Figure 4:
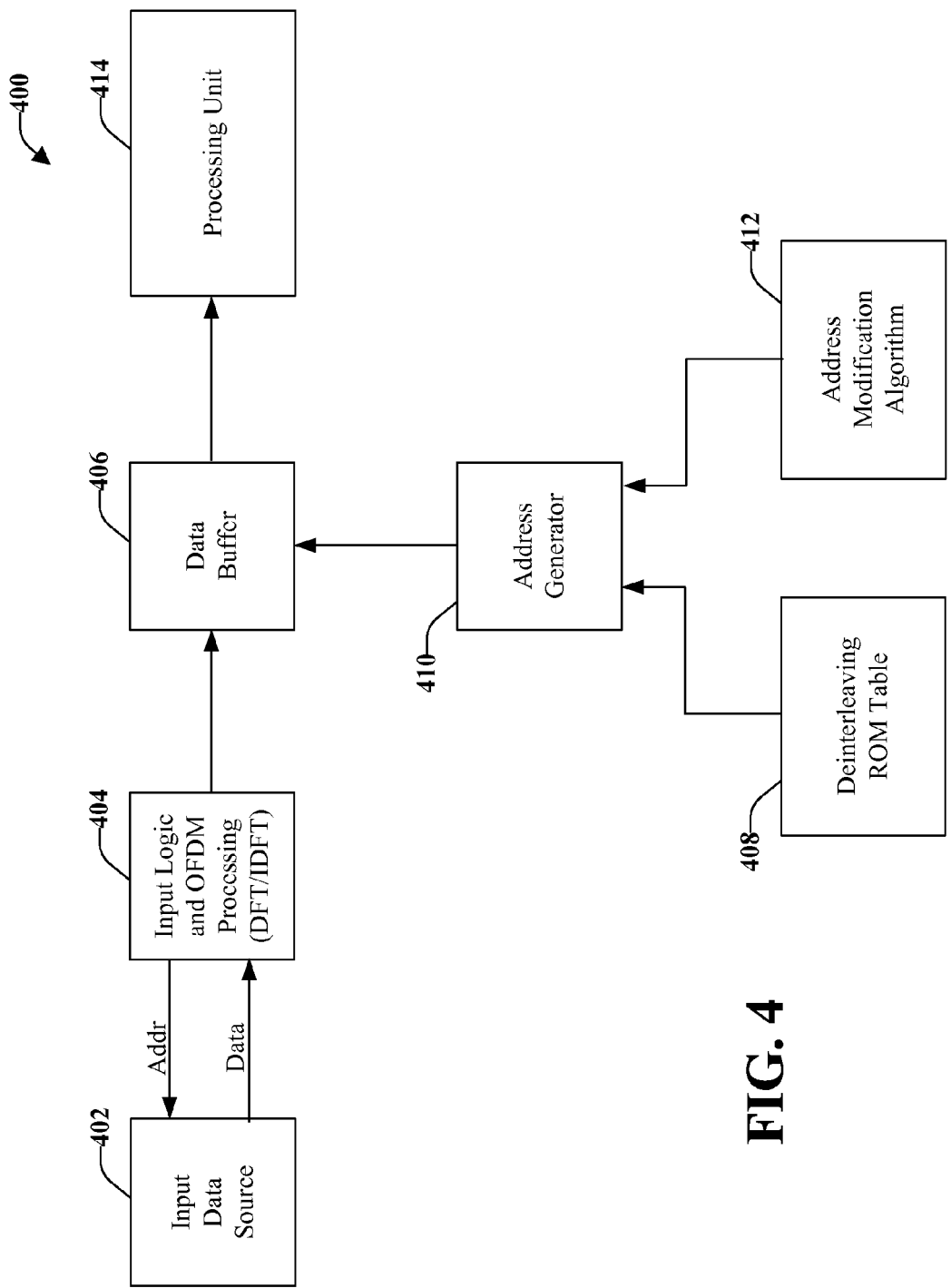
FIG. 4 illustrates a system that facilitates sample rearrangement for a communication system with cyclic extension.

FIG. 4 illustrates a system 400 that facilitates sample rearrangement for a communication system with cyclic extension. At the transmitter, data sample order permutation is introduced by interleaving the incoming data. At the receiver, as illustrated in the figure, the received input data 402 is processed by OFDM procedures 404. These procedures 404 can include the removal of the cyclic prefix, DFT processing, IDFT processing and/or other processing corresponding to a bearing signal format. The data, after IDFT processing, can be stored in a data buffer 406. The data permutation introduced by the interleaver at the transmitter can be undone by deinterleaving in order to revert to the original data order. This can be performed through properly reading out the received data buffered at the IDFT output according to a deinterleaver address ROM table 408. The read-out data can then be delivered to the next processing unit 410, which is not discussed herein for purposes of simplicity.

The case illustrated in FIG. 4 shows that, before deinterleaving, the data is buffered. However, in some cases, deinterleaving can be performed in at least two different manners depending on whether or not the data before the deinterleaver is buffered or is not buffered. If the data before the deinterleaver is not buffered, the deinterleaver address ROM table 408 contains the address described by q(i) obtained by taking the inverse of the random permutation function, p(i). Mathematically, q(p(i))=i. The address can be generated by address generator 410, which can access an address modification algorithm 412, as appropriate.

The incoming data can be deinterleaved and stored in a buffer in proper order. If the data before the deinterleaver is already buffered, the deinterleaver address ROM table 408 contains P(i). The buffered data is read out according to p(i) in proper order and can become available to the next processing unit 414.

For the case illustrated in FIG. 4, the IDFT output data is already buffered in a storage, referred to as the channel RAM buffer. Although this is the case illustrated and described herein, the disclosed aspects are applicable to either or both the interleaving implementations.

If there is no delay in the channel, the data in the channel RAM can be read out to recover the original carry-on signal by using the addresses stored in the deinterleaver address ROM table 408. When encountering a delay transmission channel, the deinterleaving address should be adjusted by compensating for possible distortion in the time sequence order before being used for reading out data sample from the channel RAM buffer. An algorithm utilized to generate a compensated address for proper deinterleaving will be described below with reference to a Deinterleaving Address Adjustment Generation algorithm.

Figure 5:
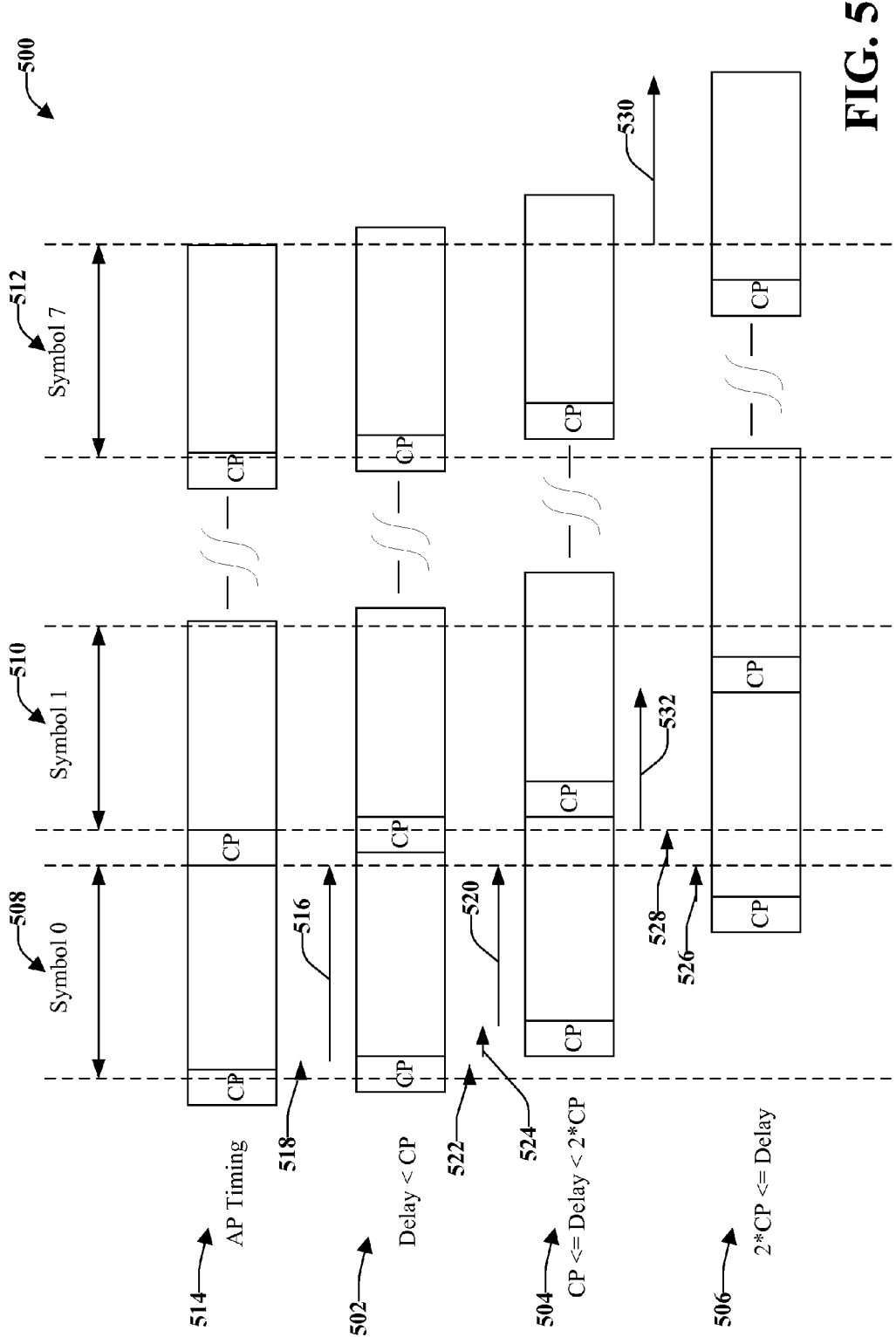
FIG. 5 illustrates a schematic representation of three delay cases that utilize data sample rearrangement.

FIG. 5 illustrates a schematic representation 500 of three delay cases that utilize data sample rearrangement. The first case 502 illustrates a delay that is less than the length of the cyclic prefix (Delay<CP). The second case 504, illustrates a delay that is longer than the cyclic prefix and shorter than two times the cyclic prefix (CP≦Delay>2*CP). The third case 506 illustrates a delay that is longer than two times the cyclic prefix (2*CP≦Delay).

Also illustrated are eight OFDM symbols, labeled Symbol 0 (508), Symbol 1 (510) through Symbol 7 (512). Each OFDM symbol includes a cyclic prefix of 128 samples. The three cases 502, 504, and 506 can be compared to a scenario having a "perfect" timing, referred to as Access Point (AP) timing 514. Since the AP timing 514 is "perfect", the cyclic prefix, when properly removed, can enable the received signal to be properly captured. The captured signal can be processed by DFT and IDFT (or other transform corresponding to a bearing signal format) to revert to the original carry-on signal.

If the delay is unknown and the signal might be captured with a delay, the received samples after the DFT and IDFT processing should be rearranged. With reference to the first case 502 having a delay shorter than the length of the cyclic prefix, after the DFT and IDFT processing, the receiver can attempt to remove the cyclic prefix of each OFDM symbol. Since there is a delay, a portion of the ending samples residing in the cyclic prefix is captured and appear in the beginning of the data sequence. A modular operation can be applied to rearrange the samples to put the ending samples back in order. The data samples aligned with the arrow 516 is taken first followed by those aligned with the arrow 518.

For the second case 504 where the delay is longer than then the cyclic prefix and shorter than two times the cyclic prefix CP≦Delay<2CP, the samples are arranged in the order of arrow 520, arrow 522, and arrow 524 where samples aligned with each arrow 520, 522, and 524 is taken from left to right. The samples aligned with arrow 522 are replaced by zero signal samples.

For the third case 506 where the delay is larger than two times the cyclic prefix 2CP≦Delay, the samples are arranged in the order of arrow 526, arrow 528, arrow 530, and arrow 532 where samples aligned with each arrow 526, 528, 530, and 532 is taken from left to right. The samples aligned with arrows 528 and 530 are replaced by zero signal samples.

An algorithm generating a compensated address for proper deinterleaving is illustrated below. In this algorithm, the size of each OFDM symbol (without the cyclic prefix) is 128. There are eight such OFDM symbols in the example below. If deinterleaving is not utilized at the receiver, the readoutAddr is set to equal to index instead of deinterleaverAddress[index]:

adjustedAddr = Deinterleaving_Adjustment(
    deinterleaverAddress, time_shift_value, CP)
{
 for index = 0 to 1023
 {

-continued

```
    readoutAddr = deinterleaverAddress[index];
//---- Case 1: Delay shorter than cyclic prefix -----
if (time_shift_value<=CP )
{    // Normal wrap around plus straight order.
    adjustedAddr = 128*floor (readoutAddr/128)
                 + (readoutAddr + time_shift_value)%128;
} // end of case 1
//---- Case 2: Delay longer than CP and smaller than 2*CP ----
else if (CP<time_shift_value <=2*CP)
{
    if ((readoutAddr + time_shift_value)%128
                <=(time_shift_value-CP))
    { // Replace lost data with a complex zero.
      adjustedAddr = addrOfComplexZero;
    }
    else
    {    // Normal wrap around plus straight order.
      adjustedAddr = 128*floor(readoutAddr/128)
                 + (readoutAddr + time_shift_value)%128;
    }
} // end of case 2
//---- Case 3: Delay longer than 2*CP ----
else if(2*CP<time_shift_value)
{
    if ((readoutAddr + time_shift_value)%128<CP
            || (readoutAddr + time_shift_value) >= 1024)
    {  // Replace lost data with a complex zero.
      adjustedAddr = addrOfComplexZero;
    }
    else
    {
      if((readoutAddr + time_shift_value)%128>=time_shift_value)
      {
        adjustedAddr = readoutAddr + time_shift_value;
      }
      else
      {
        adjustedAddr = readoutAddr + time_shift_value – CP;
      }
    }
} // end of case 3
} // end of for loop
return adjustedAddr;
}
```

In view of the exemplary systems shown and described above, methodologies that may be implemented in accordance with the disclosed subject matter, will be better appreciated with reference to the following flow charts. While, for purposes of simplicity of explanation, the methodologies are shown and described as a series of blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement the methodologies described hereinafter. It is to be appreciated that the functionality associated with the blocks may be implemented by software, hardware, a combination thereof or any other suitable means (e.g. device, system, process, component). Additionally, it should be further appreciated that the methodologies disclosed hereinafter and throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 6:
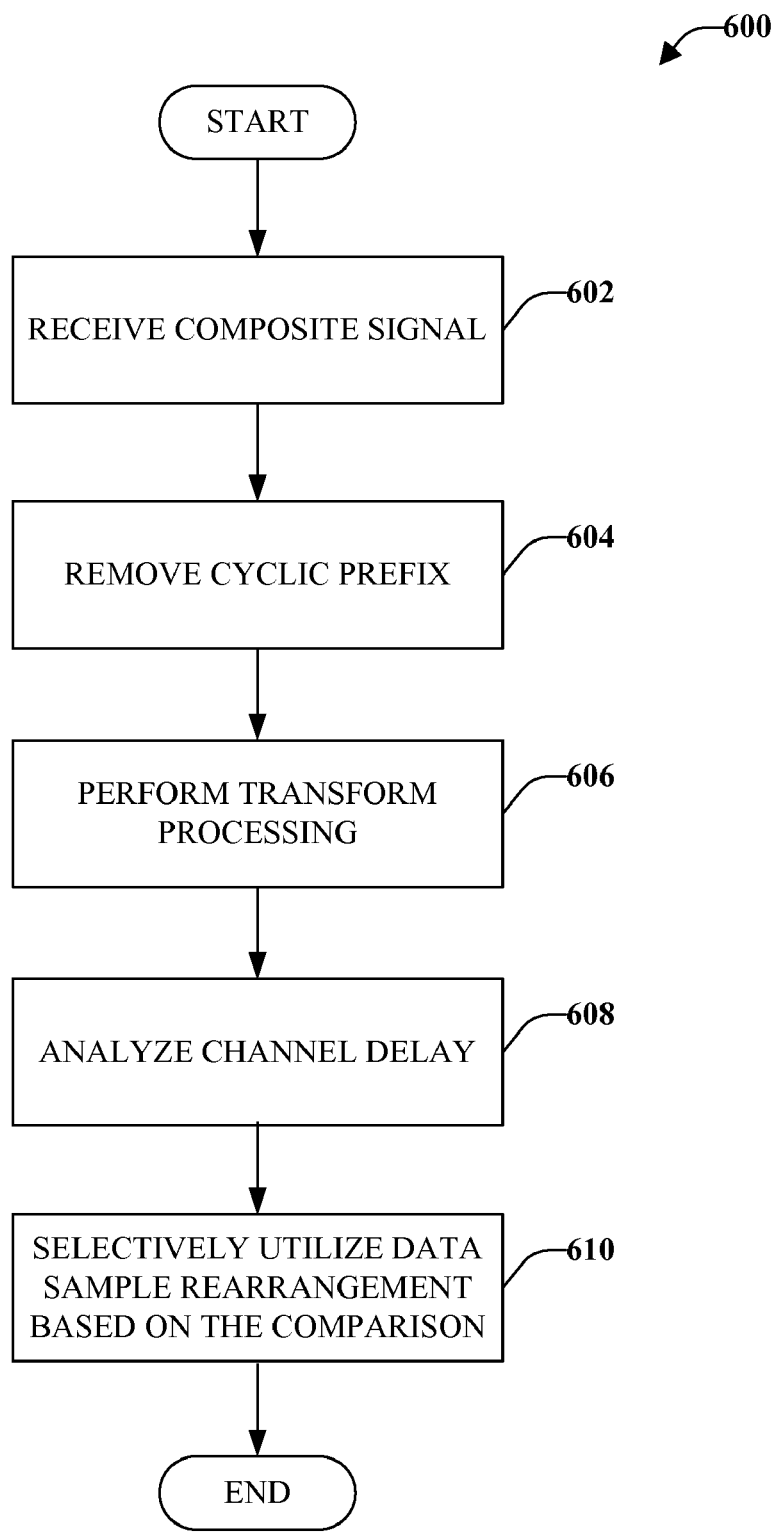
FIG. 6 illustrates a method for sample rearrangement for a communication system with cyclic extension.

FIG. 6 illustrates a method 600 for sample rearrangement for a communication system with cyclic extension. Method 600 can facilitate implementation of an address adjustment to reorder samples and to discard undesired samples, as appropriate. Thus, signal detectivity can be improved.

Method 600 starts, at 602, when a composite signal that includes a bearing signal and a carry-on signal is received. This composite signal can be sent by a transmitter on a forward link and can include a delay. During transmission of the composite signal, delays can be experienced, which can be a function of various factors including the distance between the transmitter and the receiver.

At 604, the cyclic prefix associated with the received composite signal is removed. If there are no delays or if the delay is known and there is perfect synchronization between the transmitter and the receiver, then the removal of the cyclic prefix is exact. However, due to various factors that introduce delay, which at times is unknown and/or there is imperfect synchronization between the transmitter and the receiver, the cyclic prefix might not be accurate.

At 606, transform processing that corresponds to a bearing signal format is performed. In accordance with an aspect, DFT processing is performed on the resulting signal (after removal of the cyclic prefix). The potion of the DFT output that is associated with the carry-on signal can be de-multiplexed and IDFT processing can be performed on the resulting signal (after de-multiplexing).

In the situation where the channel delay is unknown, the knowledge is imperfect and/or the synchronization is inaccurate, the time sequence of the carry-on signal after IDFT processing (or other processing corresponding to the bearing signal format) could be different from the originally transmitted signal. Thus, at 606, the channel delay is analyzed. Such analysis can include comparing the channel delay with an Access Point (AP) timing.

Based on the analysis there might be actions that should be performed to rectify a change to the originally transmitted signal due to the delay so that the signal can be more reliably decoded. Therefore, at 608, data sample rearrangement is selectively utilized based on the analysis of the channel delay. The utilized data sample rearrangement can be a factor of the length of the channel delay. There can be three different cases that should be considered. The first case is where the channel delay is less than the length of the cyclic prefix. The second case is where the delay is longer than the length of the cyclic prefix but shorter than double the length of the cyclic prefix. The third case is where the delay is longer than double the length of the cyclic prefix. Each of these cases will be discussed in further detail with reference to the following flow charts.

Figure 7:
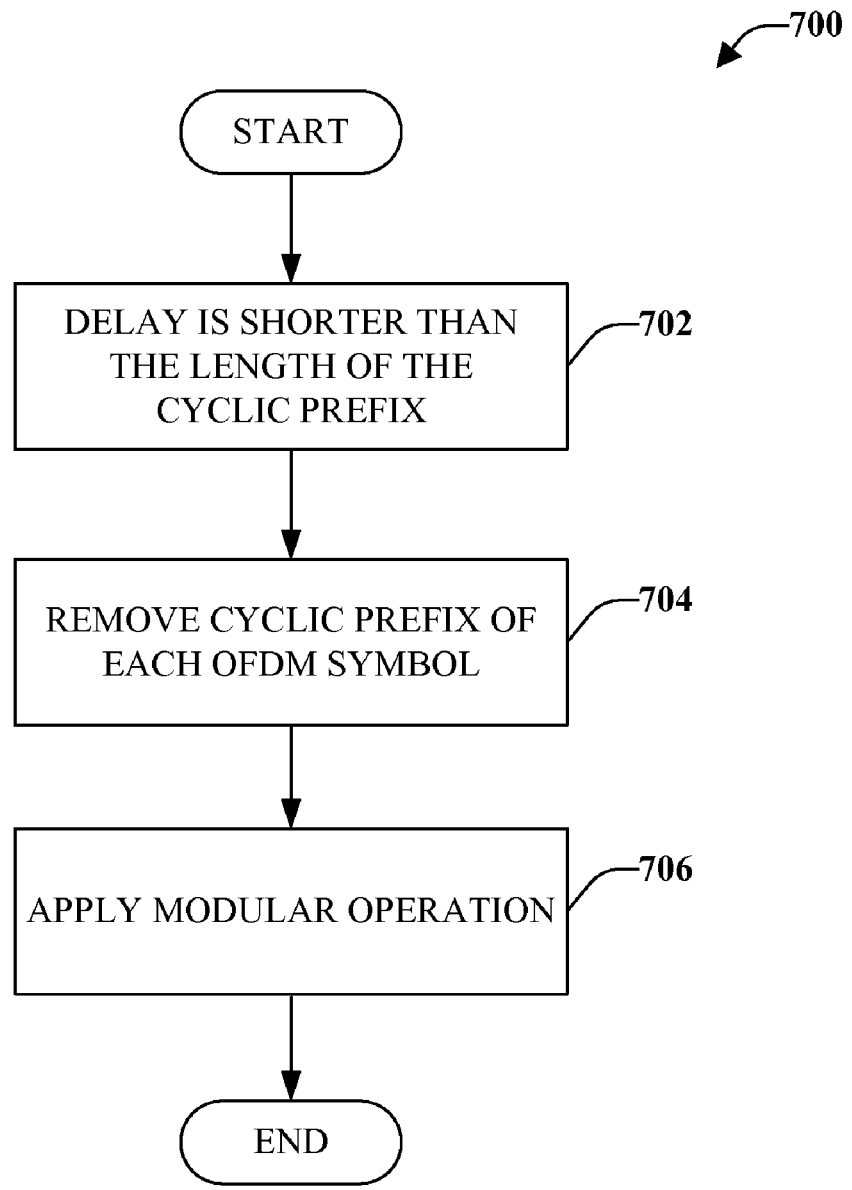
FIG. 7 illustrates a method for utilizing data sample rearrangement when the delay is less than the length of the cyclic prefix.

FIG. 7 illustrates a method 700 for utilizing data sample rearrangement when the delay is less than the length of the cyclic prefix. In this method 700, there is a normal wrap around plus a straight order. At 702, it is determined that the delay is shorter than the length of the cyclic prefix (Delay<CP). At 704, the cyclic prefix of each OFDM symbol is removed. Since there is a delay, a portion of the ending samples residing in the cyclic prefix is captured and appears in the beginning of the data sequence. At 706, a modular operation is applied to rearrange the samples to put the ending sample back in order.

Figure 8:
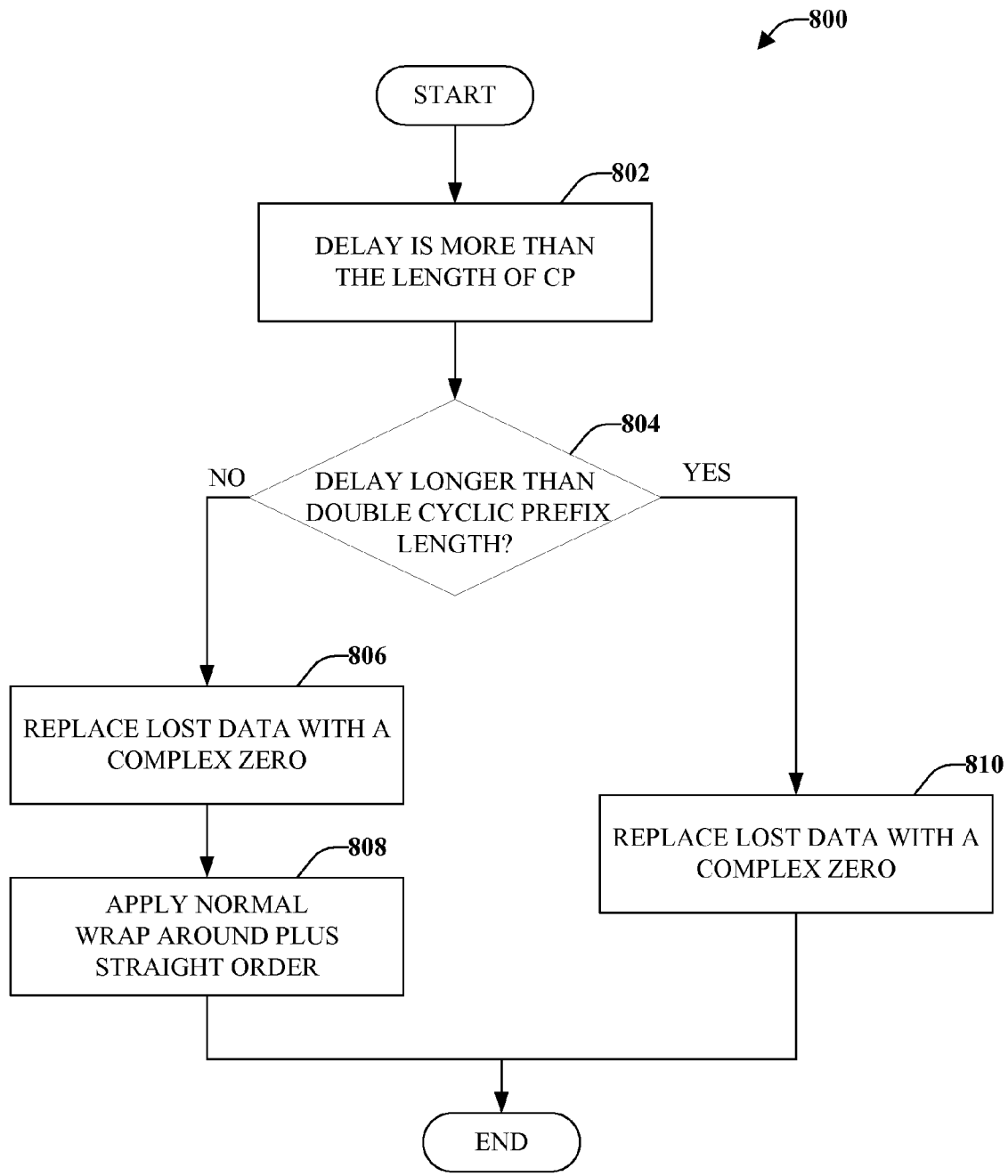
FIG. 8 illustrates a method for utilizing data sample rearrangement when the delay is longer than the length of the cyclic prefix.

FIG. 8 illustrates a method 800 for utilizing data sample rearrangement when the delay is longer than the length of the cyclic prefix. Two situations arise when the delay is longer than the length of the cyclic prefix. The first case is when the delay is equal to or more than the cyclic prefix length but is less than double the length of the cyclic prefix (CP≦Delay<2CP). The second case is when the delay is equal to or greater than double the cyclic prefix length (2CP≦Delay).

In the first case (CP≦Delay<2CP), method 800 starts, at 802 when it is determined that the delay is longer than the cyclic prefix. At 804, a determination is made whether the delay is more than double the length of the cyclic prefix. If the delay is not longer than double the length of the cyclic prefix ("NO"), method 800 continues, at 806, and the lost data is replaced with a complex zero. At 808, there is normal wrap around plus straight order.

In the second case (2CP≦Delay), at 802, it is determined that the delay is longer than the cyclic prefix. At 804, a determination is made whether the delay is more than double the length of the cyclic prefix. In this situation, the delay is longer than the cyclic prefix length ("YES") and method 800 continues, at 810, where the lost data is replaced with a complex zero.

Figure 9:
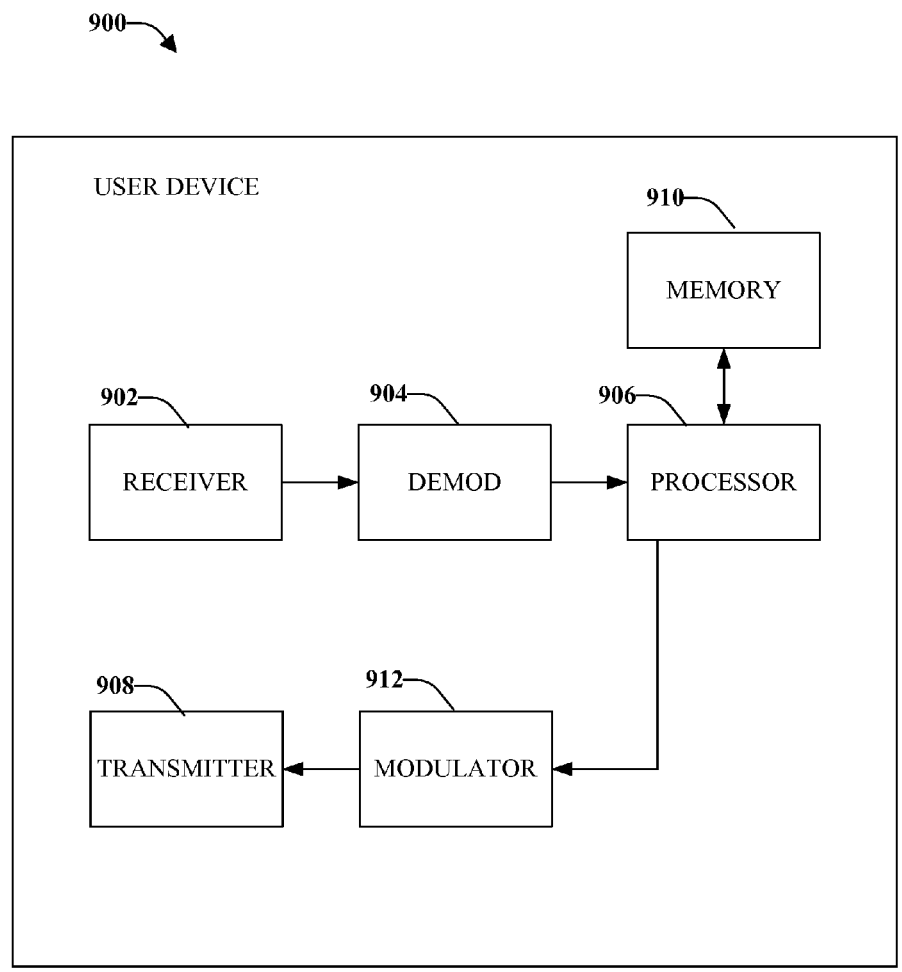
FIG. 9 illustrates a system that facilitates sample rearrangement for a communication system with cyclic extension in accordance with one or more of the disclosed aspects.

With reference now to FIG. 9, illustrated is a system 900 that facilitates sample rearrangement for a communication system with cyclic extension in accordance with one or more of the disclosed aspects. System 900 can reside in a user device. System 900 comprises a receiver 902 that can receive a signal from, for example, a receiver antenna. The receiver 902 can perform typical actions thereon, such as filtering, amplifying, downconverting, etc. the received signal. The receiver 902 can also digitize the conditioned signal to obtain samples. A demodulator 904 can obtain received symbols for each symbol period, as well as provide received symbols to a processor 906.

Processor 906 can be a processor dedicated to analyzing information received by receiver component 902 and/or generating information for transmission by a transmitter 908. In addition or alternatively, processor 906 can control one or more components of user device 900, analyze information received by receiver 902, generate information for transmission by transmitter 908, and/or control one or more components of user device 900. Processor 906 may include a controller component capable of coordinating communications with additional user devices.

User device 900 can additionally comprise memory 908 operatively coupled to processor 906 and that can store information related to coordinating communications and any other suitable information. Memory 910 can additionally store protocols associated with sample rearrangement. It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 908 of the subject systems and/or methods is intended to comprise, without being limited to, these and any other suitable types of memory. User device 900 can further comprise a symbol modulator 912 and a transmitter 908 that transmits the modulated signal.

Figure 10:
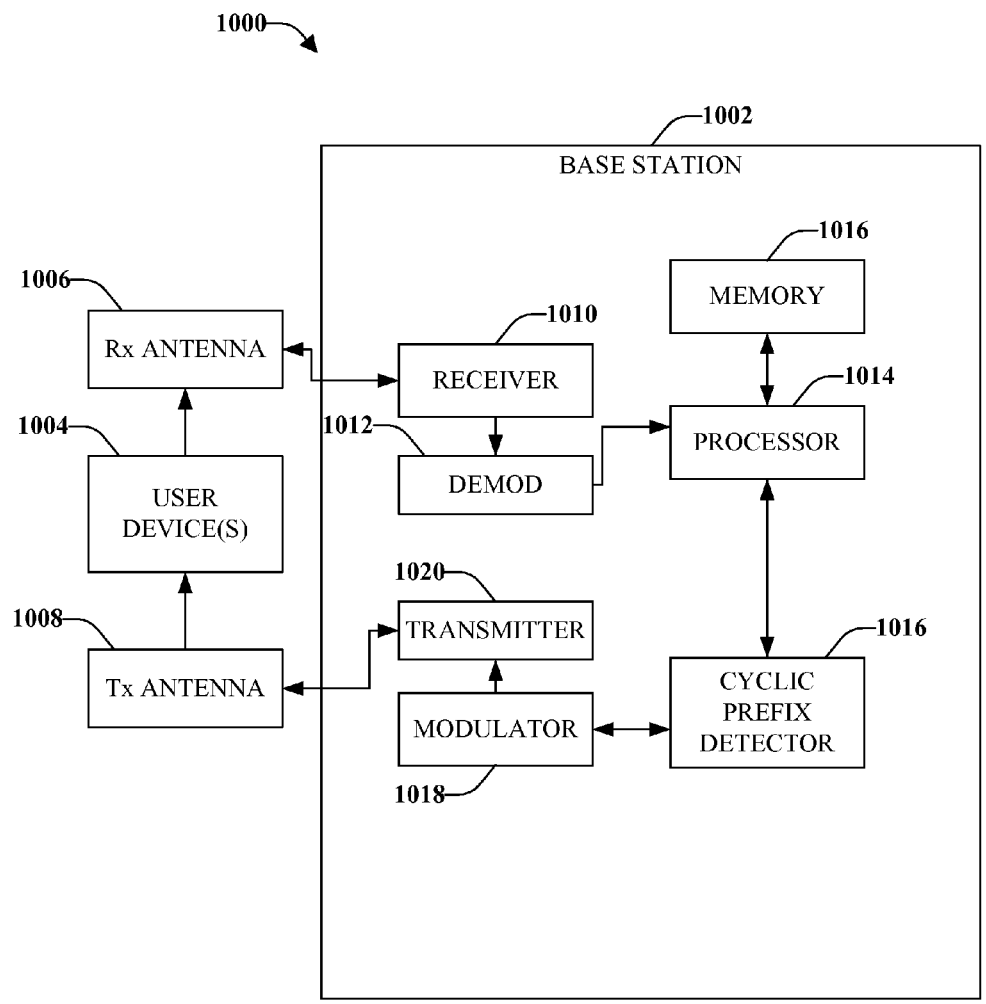
FIG. 10 is an illustration of a system that facilitates sample rearrangement for a communication system with cyclic extension in accordance with various aspects presented herein.

FIG. 10 is an illustration of a system 1000 that facilitates sample rearrangement for a communication system with cyclic extension in accordance with various aspects presented herein. System 1000 comprises a base station or access point 1002. As illustrated, base station 1002 receives signal(s) from one or more user devices 1004 by a receive antenna 1006, and transmits to the one or more user devices 1004 through a transmit antenna 1008.

Base station 1002 comprises a receiver 1010 that receives information from receive antenna 1006 and is operatively associated with a demodulator 1012 that demodulates received information. Demodulated symbols are analyzed by a processor 1014 that is coupled to a memory 1016 that stores information related to broadcast-multicast waveforms embedded in a unicast waveform. A modulator 1018 can multiplex the signal for transmission by a transmitter 1020 through transmit antenna 1008 to user devices 1004.

Processor 1014 is further coupled to a cyclic prefix detector 1016. Receiver 1010 can receive a composite signal and a cyclic prefix of the received signal can be removed by cyclic prefix detector 1016. Transform processing can be performed by processor 1014 and the channel delay analyzed. Based on the analysis, data sample rearrangement can be selectively utilized.

Figure 11:
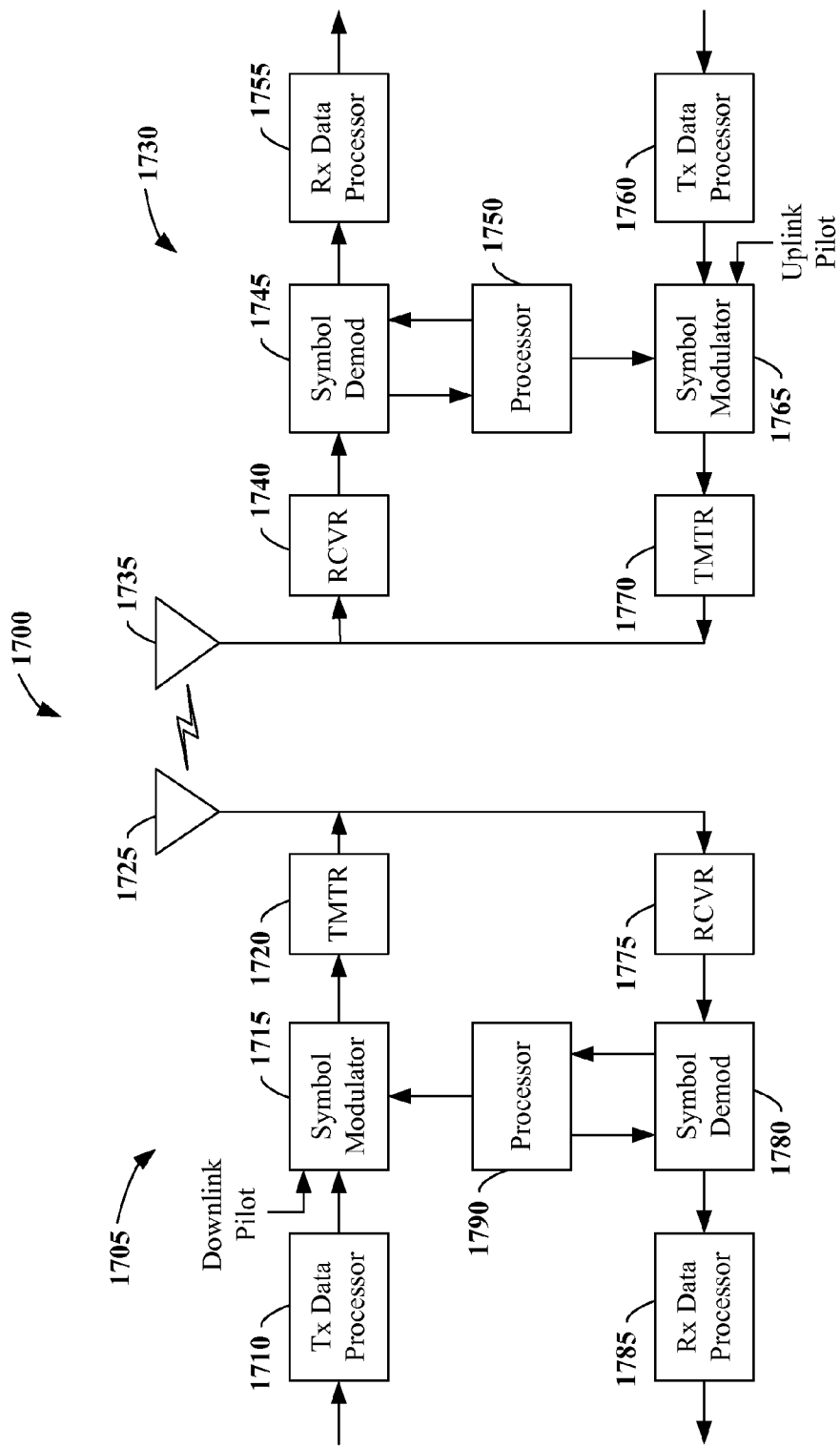
FIG. 11 illustrates an exemplary wireless communication system.

FIG. 11 illustrates an exemplary wireless communication system 1100. Wireless communication system 1100 depicts one base station and one terminal for sake of brevity. However, it is to be appreciated that system 1100 can include more than one base station or access point and/or more than one terminal or user device, wherein additional base stations and/or terminals can be substantially similar or different from the exemplary base station and terminal described below. In addition, it is to be appreciated that the base station and/or the terminal can employ the systems and/or methods described herein to facilitate wireless communication there between.

Referring now to FIG. 11, on a downlink, at access point 1105, a transmit (TX) data processor 1110 receives, formats, codes, interleaves, and modulates (or symbol maps) traffic data and provides modulation symbols ("data symbols"). A symbol modulator 1115 receives and processes the data symbols and pilot symbols and provides a stream of symbols. A symbol modulator 1115 multiplexes data and pilot symbols and obtains a set of N transmit symbols. Each transmit symbol may be a data symbol, a pilot symbol, or a signal value of zero. The pilot symbols may be sent continuously in each symbol period. The pilot symbols can be frequency division multiplexed (FDM), orthogonal frequency division multiplexed (OFDM), time division multiplexed (TDM), frequency division multiplexed (FDM), or code division multiplexed (CDM).

A transmitter unit (TMTR) 1120 receives and converts the stream of symbols into one or more analog signals and further conditions (e.g., amplifies, filters, and frequency upconverts) the analog signals to generate a downlink signal suitable for transmission over the wireless channel. The downlink signal is then transmitted through an antenna 1125 to the terminals. At terminal 1130, an antenna 1135 receives the downlink signal and provides a received signal to a receiver unit (RCVR) 1140. Receiver unit 1140 conditions (e.g., filters, amplifies, and frequency downconverts) the received signal and digitizes the conditioned signal to obtain samples. A symbol demodulator 1145 obtains Nreceived symbols and provides received pilot symbols to a processor 1150 for channel estimation. Symbol demodulator 1145 further receives a frequency response estimate for the downlink from processor 1150, performs data demodulation on the received data symbols to obtain data symbol estimates (which are estimates of the transmitted data symbols), and provides the data symbol estimates to an RX data processor 1155, which demodulates (i.e., symbol demaps), deinterleaves, and decodes the data symbol estimates to recover the transmitted traffic data. The processing by symbol demodulator 1145 and RX data processor 1155 is complementary to the processing by symbol modulator 1115 and TX data processor 1110, respectively, at access point 1105.

On the uplink, a TX data processor 1160 processes traffic data and provides data symbols. A symbol modulator 1165 receives and multiplexes the data symbols with pilot symbols, performs modulation, and provides a stream of symbols. A transmitter unit 1170 then receives and processes the stream of symbols to generate an uplink signal, which is transmitted by the antenna 1135 to the access point 1105.

At access point 1105, the uplink signal from terminal 1130 is received by the antenna 1125 and processed by a receiver unit 1175 to obtain samples. A symbol demodulator 1180 then processes the samples and provides received pilot symbols and data symbol estimates for the uplink. An RX data processor 1185 processes the data symbol estimates to recover the traffic data transmitted by terminal 1130. A processor 1190 performs channel estimation for each active terminal transmitting on the uplink.

Processors 1190 and 1150 direct (e.g., control, coordinate, manage, . . . ) operation at access point 1105 and terminal 1130, respectively. Respective processors 1190 and 1150 can be associated with memory units (not shown) that store program codes and data. Processors 1190 and 1150 can also perform computations to derive frequency and impulse response estimates for the uplink and downlink, respectively.

For a multiple-access system (e.g., FDMA, OFDMA, CDMA, TDMA, and the like), multiple terminals can transmit concurrently on the uplink. For such a system, the pilot subbands may be shared among different terminals. The channel estimation techniques may be used in cases where the pilot subbands for each terminal span the entire operating band (possibly except for the band edges). Such a pilot sub-band structure would be desirable to obtain frequency diversity for each terminal. The techniques described herein may be implemented by various means. For example, these techniques may be implemented in hardware, software, or a combination thereof. For a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof With software, implementation can be through modules (e.g., procedures, functions, and so on) that perform the functions described herein. The software codes may be stored in memory unit and executed by the processors 1190 and 1150.

Figure 12:
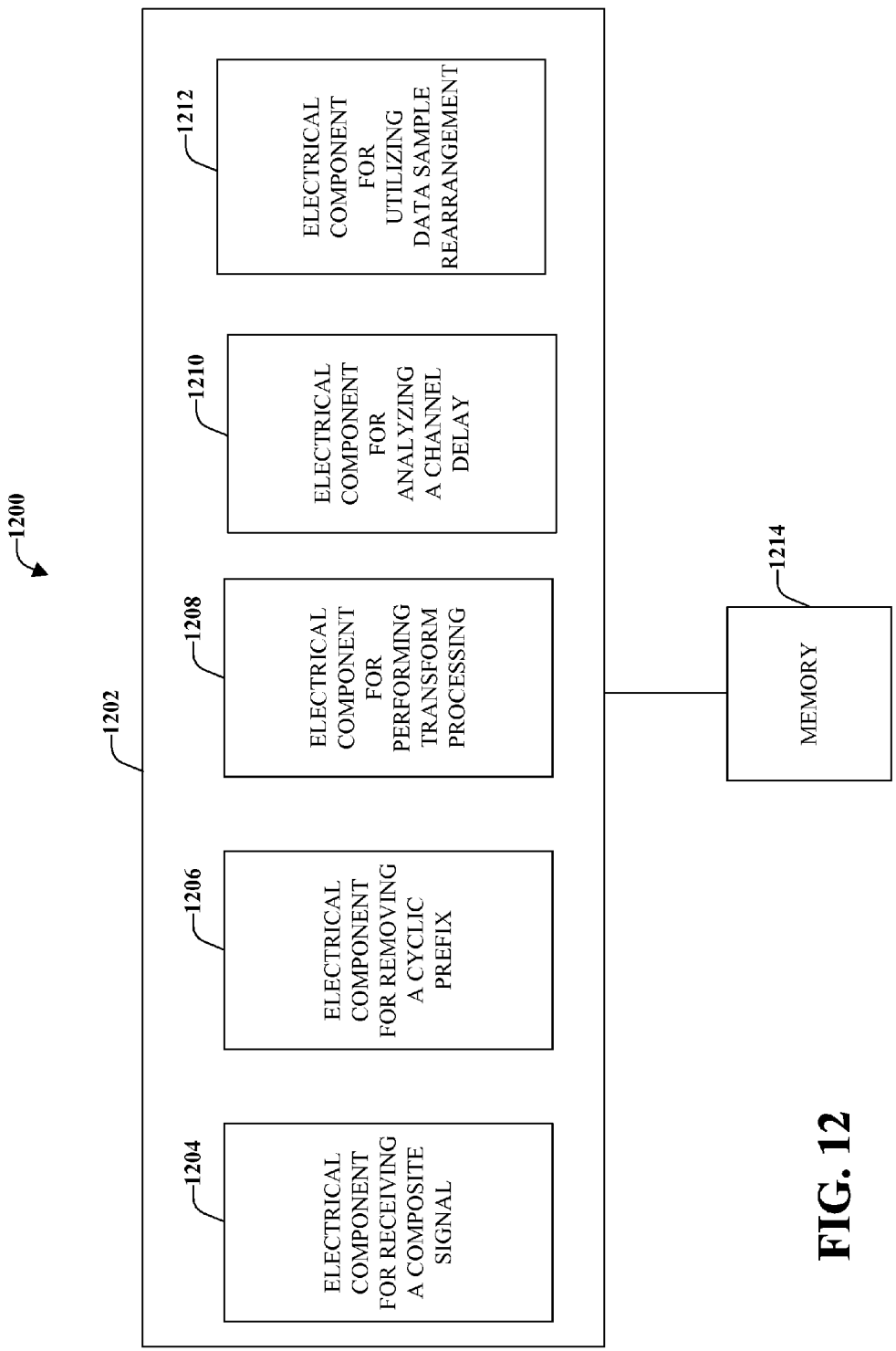
FIG. 12 illustrates a system that implements address adjustment to improve signal detectivity.

With reference to FIG. 12, illustrated is an example system 1200 that implements address adjustment to improve signal detectivity. For example, system 1200 may reside at least partially within a base station. It is to be appreciated that system 1200 is represented as including functional blocks, which may be functional blocks that represent functions implemented by a processor, software, or combination thereof (e.g., firmware).

System 1200 includes a logical grouping 1202 of electrical components that can act separately or in conjunction. For instance, logical grouping 1202 may include an electrical component for receiving a composite signal 1204. The composite signal can include a bearing signal and a carry-on signal. In accordance with some aspects, the composite signal includes an OFDM bearing signal and a CDMA carry-on signal.

Further, logical grouping 1202 can comprise an electrical component for removing a cyclic prefix of the composite signal 1206. Logical grouping 1202 can also include an electrical component for performing transform processing 1208. In accordance with some aspects, the transform processing is a Fast Fourier Transform and an Inverse Fast Fourier Transform. Also included in logical grouping 1202 can be an electrical component for analyzing a channel delay 1210. An electrical component for selectively utilizing data sample rearrangement based on the analysis 1212 is also provided.

In accordance with some aspects, logical grouping 1202 can include an electrical component for removing the cyclic prefix of each symbol and an electrical component for applying a modular operation if the analysis indicates that the channel delay is shorter than the duration of the cyclic prefix. According to other aspects, logical grouping 1202 can include an electrical component for replacing lost data of the composite signal with a complex zero and an electrical component for applying normal wrap around plus straight order if the analysis indicates that the channel delay is longer than the duration of the cyclic prefix but shorter than double the duration of the cyclic prefix. Alternatively or additionally, logical grouping 1202 can include an electrical component for replacing lost data with a complex zero if the analysis indicates that the channel delay is longer than double the duration of the cyclic prefix.

Additionally, system 1200 can include a memory 1214 that retains instructions for executing functions associated with electrical components 1204, 1206, 1208, 1210, and 1212 or other components. While shown as being external to memory 1214, it is to be understood that one or more of electrical components 1204, 1206, 1208, 1210, and 1212 may exist within memory 1214.

It is to be understood that the aspects described herein may be implemented by hardware, software, firmware, middleware, microcode, or any combination thereof. When the systems and/or methods are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor through various means as is known in the art. Further, at least one processor may include one or more modules operable to perform the functions described herein.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product may include a computer readable medium having one or more instructions or codes operable to cause a computer to perform the functions described herein.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

While the foregoing disclosure discusses illustrative aspects and/or aspects, it should be noted that various changes and modifications could be made herein without departing from the scope of the described aspects and/or aspects as defined by the appended claims. Accordingly, the described aspects are intended to embrace all such alterations, modifications and variations that fall within scope of the appended claims. Furthermore, although elements of the described aspects and/or aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

To the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description of the claims is meant to be a "non-exclusive or".

What is claimed is:

1. A method for sample rearrangement with cyclic extension, comprising:
   receiving a composite signal;
   removing a cyclic prefix of the composite signal;
   performing transform processing;
   analyzing a channel delay;
   selectively utilizing data sample rearrangement based on the analysis; and
   replacing lost data of the composite signal with a complex zero if analysis of the channel delay indicates that the channel delay is longer than double a length of the cyclic prefix of the composite signal.

2. The method of claim 1, further comprising:
   removing a cyclic prefix of each symbol; and
   applying a modular operation if the analysis indicates that the channel delay is shorter than the length of the cyclic prefix of the composite signal.

3. The method of claim 1, further comprising:
   replacing the lost data of the composite signal with a complex zero; and
   applying normal wrap around plus straight order if the analysis indicates that the channel delay is longer than the length of the cyclic prefix but shorter than double the length of the cyclic prefix.

4. The method of claim 1, wherein the composite signal comprises a bearing signal and a carry-on signal.

5. The method of claim 1, wherein the transform processing is a Fast Fourier Transform and an Inverse Fast Fourier Transform.

6. The method of claim 1, wherein the composite signal includes an OFDM bearing signal and a CDMA carry-on signal.

7. A wireless communications apparatus, comprising:
   a processor that receives a composite signal, removes a cyclic prefix of the composite signal, performs transform processing, evaluates a channel delay, applies data sample rearrangement based on the analysis, and replaces lost data of the composite signal with a complex zero if evaluation of the channel delay reveals that the channel delay is longer than double a length of the cyclic prefix of the composite signal; and
   a memory that stores information related to the analysis made by the processor.

8. The apparatus of claim 7, the processor further removes a cyclic prefix of each symbol and applies a modular operation if the evaluation reveals that the channel delay is shorter than the length of the cyclic prefix of the composite signal.

9. The apparatus of claim 7, the processor further replaces the lost data with a complex zero and applies a normal wrap around plus straight order if the evaluation reveals that the channel delay is longer than the length of the cyclic prefix and shorter than double the length of the cyclic prefix.

10. The apparatus of claim 7, wherein the composite signal comprises a bearing signal and a carry-on signal.

11. The apparatus of claim 7, wherein the transform processing is a Fast Fourier Transform and an Inverse Fast Fourier Transform.

12. The apparatus of claim 7, wherein the composite signal includes an OFDM bearing signal and a CDMA carry-on signal.

13. A wireless communications apparatus that implements address adjustment to improve signal detectivity, comprising:
   means for receiving a composite signal;

means for removing a cyclic prefix of the composite signal;
means for performing transform processing;
means for analyzing a channel delay;
means for selectively utilizing data sample rearrangement based on the analysis; and
means for replacing lost data of the composite signal with a complex zero if analysis of the channel delay indicates that the channel delay is longer than double a length of the cyclic prefix of the composite signal.

14. The apparatus of claim 13, further comprising:
means for removing a cyclic prefix of each symbol; and
means for applying a modular operation if the means for analyzing indicates that the channel delay is shorter than the length of the cyclic prefix.

15. The apparatus of claim 13, further comprising:
means for replacing the lost data of the composite signal with a complex zero; and
means for applying normal wrap around plus straight order if the means for analyzing indicates that the channel delay is longer than the length of the cyclic prefix but shorter than double the length of the cyclic prefix.

16. The apparatus of claim 13, wherein the composite signal comprises a bearing signal and a carry-on signal.

17. The apparatus of claim 13, wherein the transform processing is a Fast Fourier Transform and an Inverse Fast Fourier Transform.

18. The apparatus of claim 13, wherein the composite signal includes an OFDM bearing signal and a CDMA carry-on signal.

19. A machine-readable medium having stored thereon machine-executable instructions for sample rearrangement with cyclic extension, comprising:
receiving a composite signal that comprises a bearing signal and a carry-on signal;
removing a cyclic prefix of the composite signal;
performing Discrete Fourier Transform processing and an Inverse Discrete Fourier Transform processing;
analyzing a channel delay;
selectively utilizing data sample rearrangement based on the analysis; and
replacing lost data of the composite signal with a complex zero if analysis indicates that the channel delay is longer than double a length of the cyclic prefix of the composite signal.

20. The machine-readable medium claim 19, further comprising:
removing the cyclic prefix of each symbol; and
applying a modular operation if the analysis indicates that the channel delay is shorter than the length of the cyclic prefix.

21. The machine-readable medium of claim 19, further comprising:
replacing the lost data of the composite signal with a complex zero; and
selectively applying normal wrap around plus straight order if the analysis indicates that the channel delay is longer than the length of the cyclic prefix and shorter than double the length of the cyclic prefix.

22. In a wireless communication system, an apparatus comprising:
a processor configured to:
receive a composite signal that comprises an OFDM bearing signal and a CDMA carry-on signal;
remove a cyclic prefix of the composite signal;
perform a Fast Fourier Transform process and an Inverse Fast Fourier Transform process;
analyze a channel delay;
selectively utilize data sample rearrangement based on the analysis; and
replace lost data of the composite signal with a complex zero if analysis of the channel delay indicates that the channel delay is longer than double a length of the cyclic prefix of the composite signal.

* * * * *